May 24, 1932.  J. G. HEASLET  1,859,331
CONTAINER
Filed June 17, 1931
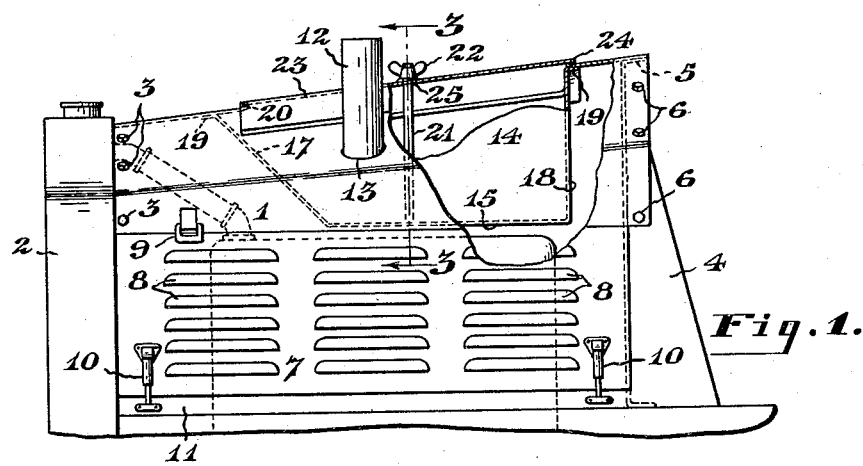
Fig. 1.
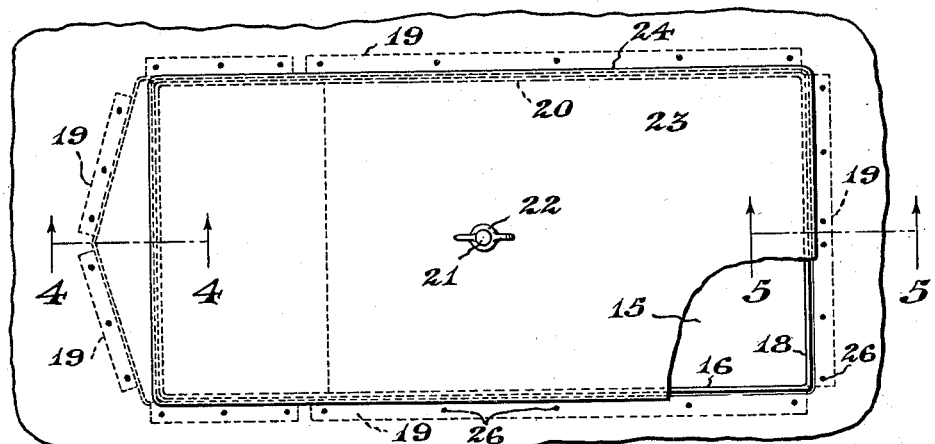
Fig. 2.
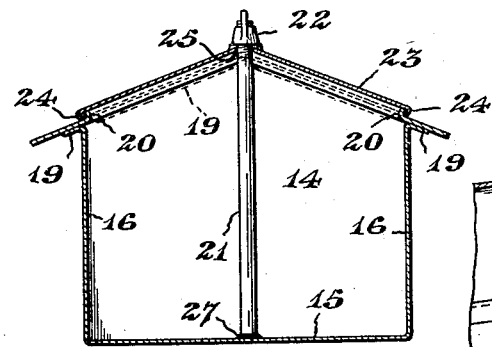
Fig. 3.
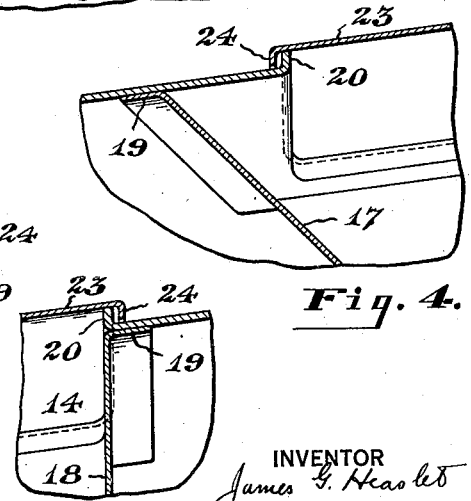
Fig. 4.
Fig. 5.
INVENTOR
James G. Heaslet
BY George D. Jones
ATTORNEY Patented May 24, 1932

1,859,331

UNITED STATES PATENT OFFICE

JAMES G. HEASLET, OF CLEVELAND, OHIO, ASSIGNOR TO THE CLEVELAND TRACTOR COMPANY, OF CLEVELAND, OHIO

CONTAINER

Application filed June 17, 1931. Serial No. 544,971.

My invention relates to containers and more especially to containers that are used in connection with tractors to carry tools and the like.

It has been customary in the past to mount tool boxes or containers on the fenders of the tractors, and in locations where their position hampered the operator in his duties in operating the tractor, as a result, the tool boxes are often broken and in many instances are lost. It is common practice due to the loss of tool boxes from tractors for the operator to carry a few of the smaller tools in his pocket, leaving the larger tools at the garage or shed used to house the tractor, thus necessitating delays caused by the necessity of returning to the tractor shed for tools when minor repairs are necessary.

It is the purpose of my invention to produce a tool box or container so built into the hood of the tractor that it cannot be on obstruction to the operator, cannot be lost or damaged and does not mar the appearance of the tractor.

It is therefore an object of my invention to build into the hood of a tractor and forming an integral part thereof, a container for the purpose of carrying tools or the like and of such capacity that a number of tools can be carried therein sufficient to carry on the usual repairs and adjustments necessary in the operation of a tractor.

Another object of my invention is to locate a container on a tractor whereby the movement over rough ground will not have a tendency to throw out the contents.

A further object of my invention is to locate a tool box or container on a tractor so that the tools may be placed therein and taken therefrom, without disturbing the normal operation of the tractor.

These and other objects will appear from the specifications.

In the accompanying drawings:

Fig. 1 is a side elevation of the fore part of a tractor with parts broken away to show container.

Fig. 2 is a plan view of the hood and container with part of container cover broken away.

Fig. 3 is a section taken on lines 3—3 of Fig. 1.

Fig. 4 is a section taken on lines 4—4 of Fig. 2.

Fig. 5 is a section taken on lines 5—5 of Fig. 2.

Referring now to all the figures of the drawings, in all of which like parts are designated by like reference characters, reference character 1 indicates a hood covering the mechanism of a conventional form of a motor, preferably as used on a tractor, which is secured to the radiator 2 by bolts 3. The rear end of the hood is secured to a dash 4, preferably to a flanged portion 5, by securing means such as bolts 6. The hood is preferably shaped with the sides inclined downwardly to carry off moisture. On each side of the hood and attached thereto are side covers 7, with louvers 8 therein, the side covers are swingingly fastened at their upper portions by a suitable hinge 9 and clamped in rigid position by clamp fasteners 10 attached to the body portion of the main frame 11. Within the hood covering is a motor and mechanism thereof, shown in dotted form in Fig. 1, including an exhaust pipe 12 which passes through a circular aperture 13 in the hood.

An aperture is cut in the hood, preferably centrally of the same and the edges 20 of the hood aperture are upturned, forming a flange around the opening. Associated with the hood is a container 14, which is formed of a bottom portion 15, side portions 16, a front portion 17, and the rear portion 18. The top edges of the front portion, side portions and rear portions are turned outwardly to form flanges, which are rigidly secured to the under side of the hood by any suitable means, preferably by welding as indicated at 26. The walls of the container coincide with the flanged edges of the aperture.

Centrally located in the container is a rod 21 which is preferably secured to the bottom portion 15 by welding as indicated at 27. The top of the rod is threaded to receive a thumb screw 22 and extends through a cover 23 designed to conform to the contour of the hood. The cover edges 24 are downturned to form a flange, and an aperture 25 is centrally located therein for the reception of the rod 21. The cover 23 is removably secured in position by the thumb screw 22, and when the screw is removed, the cover can be taken off of the hood. The front portion 17 of the container 14 is preferably inclined rearwardly of the hood for the purpose of clearing a part of the mechanism of the motor.

It will be appreciated that by placing the tool container within the hood and supplying a suitable cover therefore, all tools such as pliers, wrenches and the like can be quickly and easily removed or replaced, and will be securely carried without loss. The cover, which as above described, fits over the container and, due to the design, will shed all moisture thereby keeping the tools in workable condition. The tools can thus be stored in an unused space within the overall dimension of the tractor, and therefore its location is not objectionable.

It is understood that I do not limit myself to the form of the container shown and described herein, as the invention as set forth in the following claim may be embodied in a plurality of forms.

What I claim is:—

In a covering for the mechanism of a motor, a hood having an aperture therein, a container and a detachable cover therefor, said container having bottom and side portions, the upper edges of the container side portions being turned outwardly to form flanges for securing the container to the hood adjacent the aperture thereof, the edges of the hood aperture being upturned, the edges of the detachable cover being turned downwardly, whereby when in operative position the downturned edges of the cover will fit over the upturned edges of the hood aperture completely closing the same and cover securing means extending from the bottom of said container through said cover.

In testimony whereof I affix my signature.

JAMES G. HEASLET.